US012616211B1

(12) United States Patent
Mesa-Arias

(10) Patent No.: US 12,616,211 B1
(45) Date of Patent: May 5, 2026

(54) AUTOMATIC ROTARY EMPANADA MACHINE

(71) Applicant: Emma E. Mesa-Arias, Manizales (CO)

(72) Inventor: Emma E. Mesa-Arias, Manizales (CO)

( * ) Notice: Subject to any disclaimer, the term of this patent is extended or adjusted under 35 U.S.C. 154(b) by 331 days.

(21) Appl. No.: 18/129,127

(22) Filed: Mar. 31, 2023

(51) Int. Cl.
　　*G05B 19/05* (2006.01)
　　*A21C 9/06* (2006.01)
(52) U.S. Cl.
　　CPC .............. *A21C 9/063* (2013.01); *G05B 19/05* (2013.01); *G05B 2219/14005* (2013.01)
(58) Field of Classification Search
　　CPC .................... A21C 9/063; G05B 19/05; G05B 2219/14005
　　See application file for complete search history.

(56) References Cited

U.S. PATENT DOCUMENTS

| | | | | | |
|---|---|---|---|---|---|
| 4,759,706 | A | * | 7/1988 | Damianakos | ........... A47J 43/20 249/170 |
| 5,263,407 | A | * | 11/1993 | Pomara, Jr. | ............. A23P 20/20 99/450.6 |
| 2003/0209194 | A1 | * | 11/2003 | Amigh | .................... A21C 9/04 118/52 |
| 2016/0316768 | A1 | * | 11/2016 | Mesa-Escuderos | .... A21C 9/063 |

* cited by examiner

*Primary Examiner* — Aleksey Olshannikov
(74) *Attorney, Agent, or Firm* — Luis Figarella

(57) ABSTRACT

The invention relates to an automatic rotary machine for the automate production of empanadas, comprising up to six mold holding stations within a rotating circular deck plate on which the empanadas are filled from an automated filling dispenser and folded through electric and pneumatic motors and actuators. The invention includes a mold for folding and cutting the empanada dough.

6 Claims, 10 Drawing Sheets

704
504
502
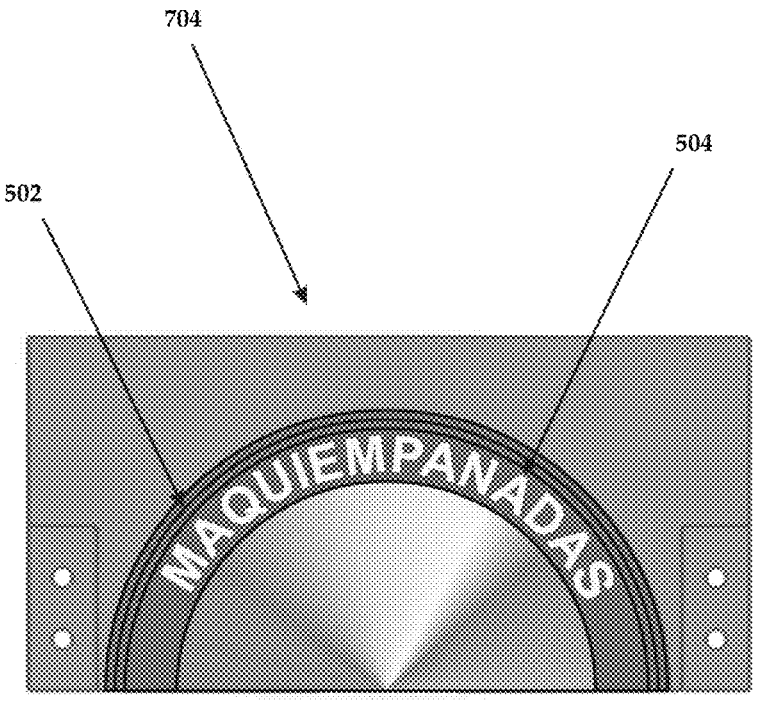
Figure 5
602
604
Figure 6
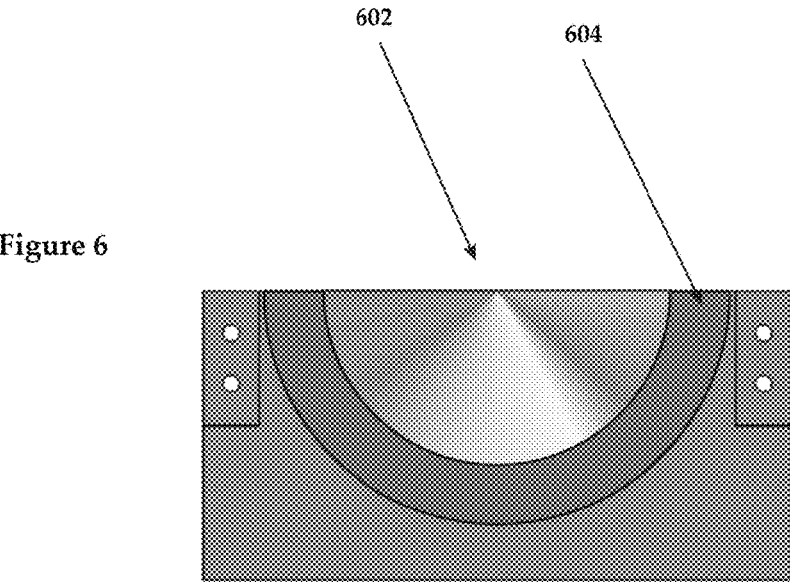

204

502

704

602

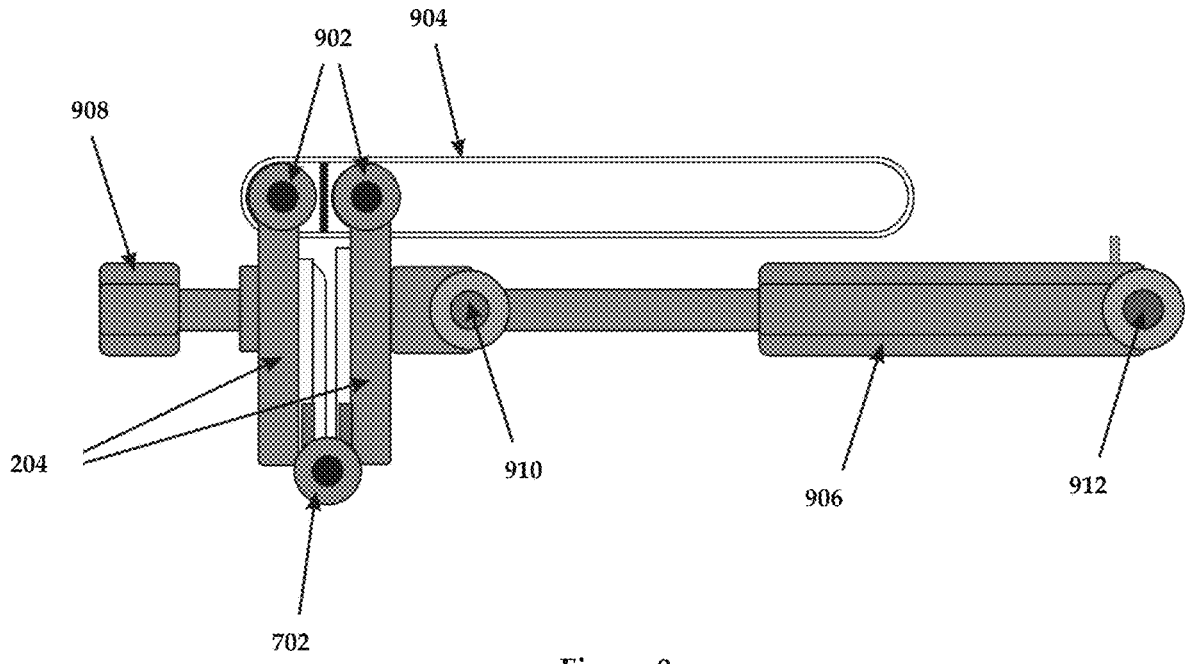
Figure 9
Figure 10
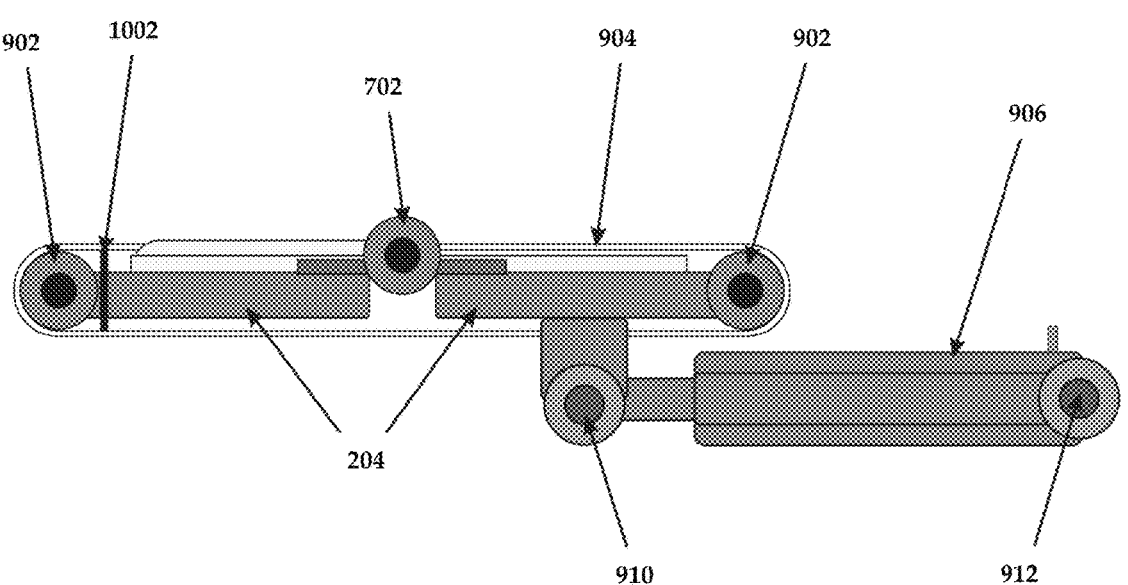

106

100

AUTOMATIC ROTARY EMPANADA MACHINE

PATENTS CITED

The following documents and references are incorporated by reference in their entirety, Mesa-Escudero (U.S. Pat. No. 9,357,788 and U.S. Pat. Pub. No. 2016/0316768).

FIELD OF THE INVENTION

The present invention relates to a system and method for the automatic rotary machine production of empanadas.

DESCRIPTION OF THE RELATED ART

Empanadas or turnovers are made from mixtures of various different edible compounds, with the wrapper or skin usually made of various flours (including corn and wheat flours), and the internal fillings made from one or more of beef, pork, chicken, cheese, grains, vegetables, etc., and seasoned with various spices. They are usually hand-made, with the various processes all performed by hand. These processes include kneading the corn or wheat flour and then flattening with wooden or plastic rollers, before finally assembling them by flattening the dough and placing in the center a portion of the filling before covering the filling by typically folding the flattened dough. The 'closing' is typically accomplished by pressing them with your hand on their edges and then cutting the excess dough also with your hand or with a circular containers or molds. Manual manufacturing is for small productions because a lot of time is invested per unit.

Empanadas are mixtures of different foods which usually have a coating of dough made from flour, with fillings of meat, vegetables and other compounds that make them a good meal replacement. Empanadas are manufactured in different ways and forms using different techniques, most conventional being processed manually, through kneading cornmeal or wheat flour and then flattening them with rollers made of wood, placing the flattened dough mass (which we term the empanada wrapper) and then placing within the center portion a filling of pre-cooked and seasoned (usually with meats or vegetables) and covering with the dough by folding it around the filling, wherein surplus dough around the edges or rim is removed or cut either by hand or with the help of a semi-circular shaped vessel.

For the production of empanadas on a large scale, various machines have been designed and manufactured, some with patents, including patent numbers CO11-041168, CO12-088978 patent AR 031737 (A1) AR19750261219 and patent NC2018/0034135. Many of these machines are relatively slow, adding the filling to the dough fabric, so as to close it, cut the surplus around the edge and remove it.

When we add the need to handle the product post-production, the need to account for the automatic expulsion of the finished empanada requires for the use of a double jaw mechanisms which opens and closes automatically. Such a mechanism could carry custom molds of different sizes with features that would seals and mark the empanadas, that are assembled over conveyor belts increasing their efficiency and allowing for the control by the IOT (Internet of Things)

SUMMARY OF THE INVENTION

This section is for the purpose of summarizing some aspects of the present invention and to briefly introduce some embodiments. Simplifications or omissions may be made to avoid obscuring the purpose of the section. Such simplifications or omissions are not intended to limit the scope of the present invention.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e., that it will be taken to mean an inclusion of not only the listed components it directly references, but also other non-specified components or elements. This rationale will also be used when the term 'comprised' or 'comprising' is used in relation to one or more steps in a method or process.

In one aspect, the invention is about an automatic rotary empanada manufacturing system comprising an Internet of Things (IoT) programmable logic control (PLC) units sensing and activating a number of rotary motion, filling and empanada mold folding components, a circular rotary deck turntable having six openings, each said opening having a replaceable folding empanada mold within said opening, each said mold comprised of: two complementary shaped halves hinged and closed by a plunger, said plunger controlled by said PLC, an automatic empanada filling dosing machine, with a dispenser opening placed over the center of one said opening path of motion, said dispenser controlled by said PLC, a central holder for empanada blanks and a finished empanada belt. In another aspect, said deck rotator motion is accomplished via an electric motor, said actuator for empanada filling dispensing and folding empanada mold is comprised of one of: a hydraulic piston, a pneumatic piston, worm gear, pinion or rack and each said actuator for empanada filling dispensing and folding empanada mold is adjustable according to the raw material from which the dough is made. In yet another aspect, at least one of each said actuator for empanada filling dispensing and folding empanada mold is under said PLC units' control.

In one aspect, the invention is about an automatic rotary empanada manufacturing method comprising an Internet of Things (IoT) programmable logic control (PLC) units sensing and activating a number of rotary motion, filling and empanada mold folding components, a circular rotary deck turntable having six openings, each said opening having a replaceable folding empanada mold within said opening, each said mold comprised of: two complementary shaped halves hinged and closed by a plunger, said plunger controlled by said PLC, an automatic empanada filling dosing machine, with a dispenser opening placed over the center of one said opening path of motion, said dispenser controlled by said PLC, a central holder for empanada blanks and a finished empanada belt. In another aspect, said deck rotator motion is accomplished via an electric motor, said actuator for empanada filling dispensing and folding empanada mold is comprised of one of: a hydraulic piston, a pneumatic piston, worm gear, pinion or rack and each said actuator for empanada filling dispensing and folding empanada mold is adjustable according to the raw material from which the dough is made. In yet another aspect, at least one of each said actuator for empanada filling dispensing and folding empanada mold is under said PLC units' control.

Other features and advantages of the present invention will become apparent upon examining the following detailed description of an embodiment thereof, taken in conjunction with the attached drawings, which are provided for purposes of illustration and not of limitation.

BRIEF DESCRIPTION OF THE DRAWINGS

Figure 2:
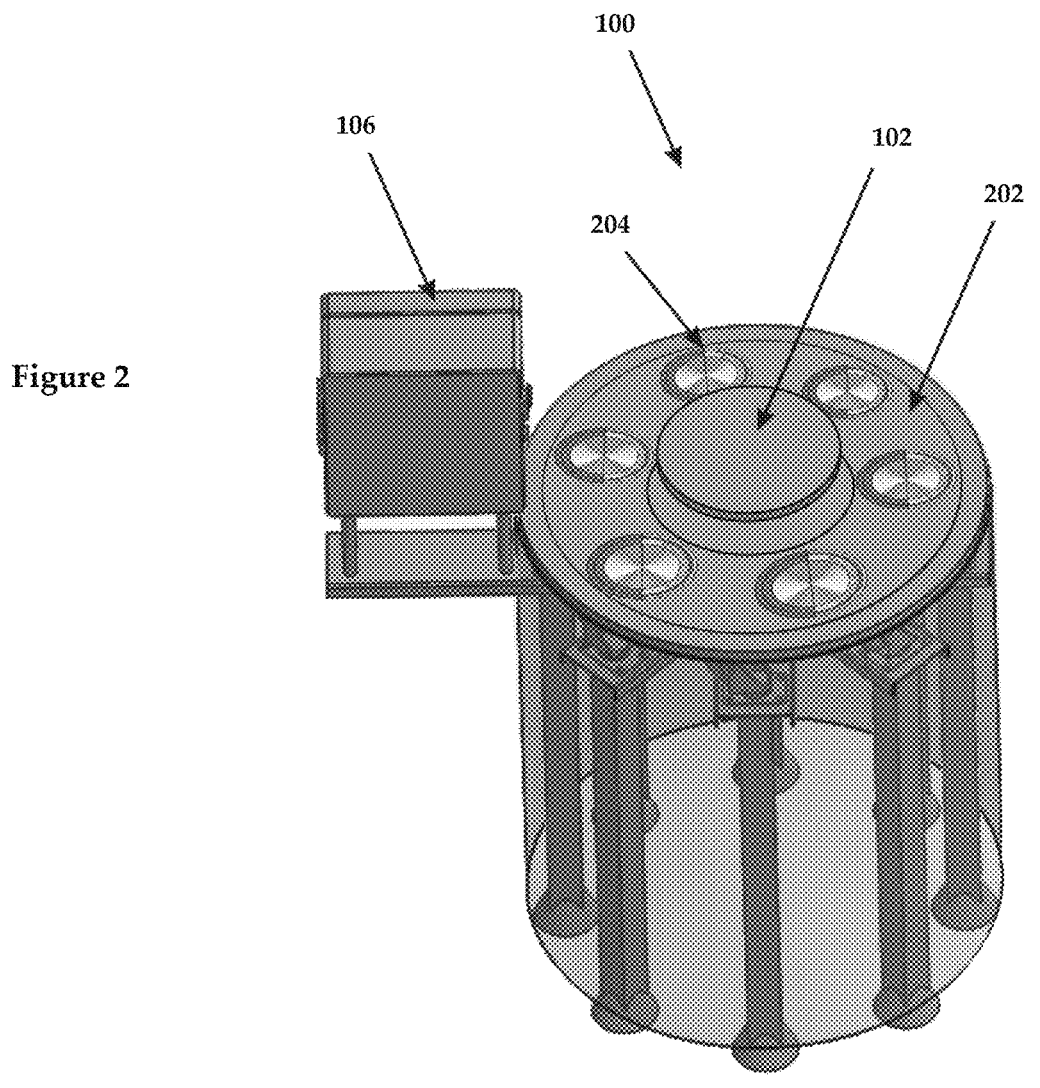

FIG. 2 shows an upper back perspective of the automatic rotary empanada machine, according to an exemplary embodiment of the invention.

FIG. 5 shows a top view of upper part of the empanada mold, according to an exemplary embodiment of the invention.

FIG. 6 shows a top view of the lower part of the empanada mold, according to an exemplary embodiment of the invention.

FIG. 9 shows a side view of the empanada mold close and trimming mechanism, according to an exemplary embodiment of the invention.

FIG. 10 shows a side view of the empanada mold when open, according to an exemplary embodiment of the invention.

Figure 1:
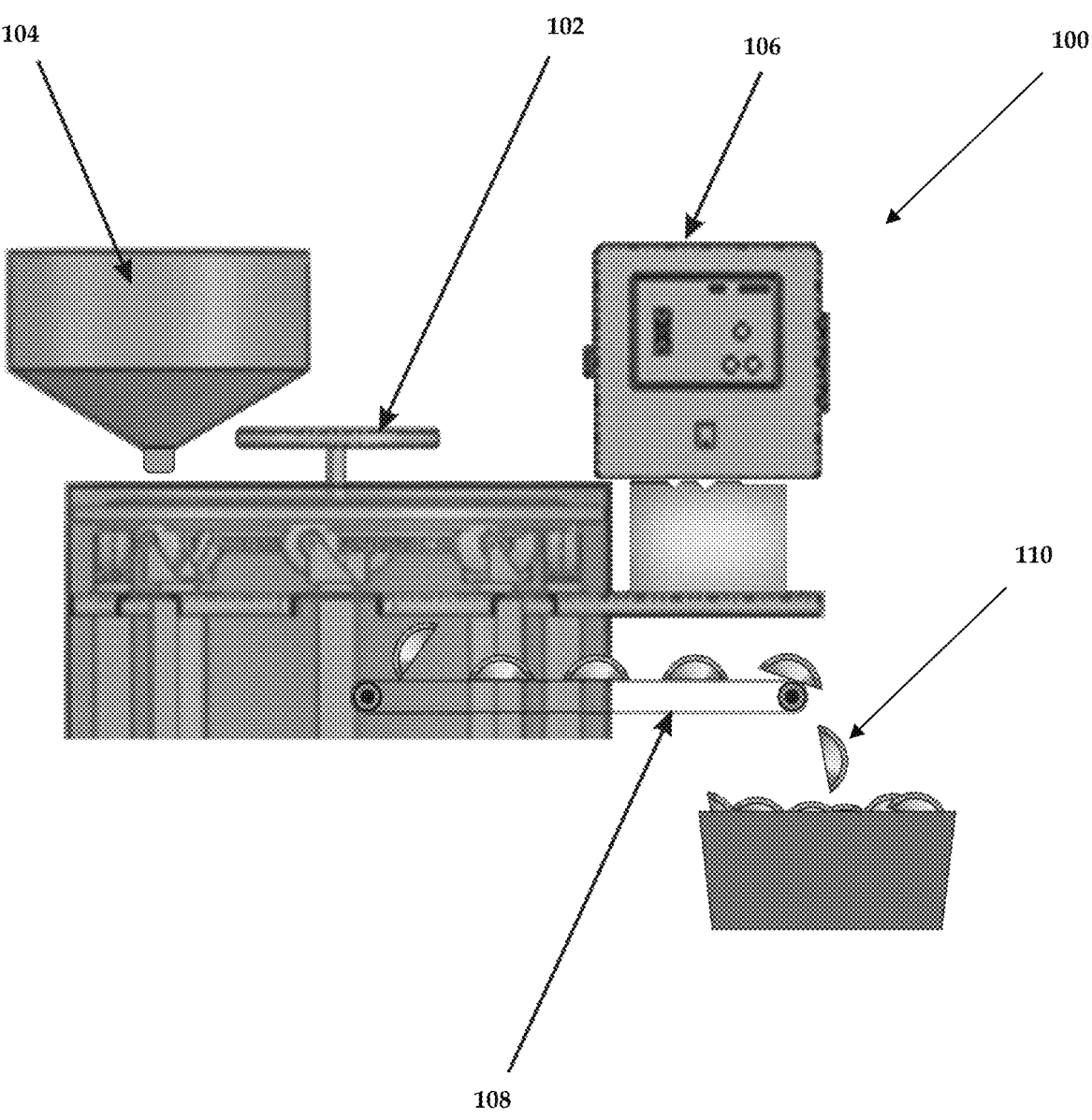
FIG. 1 shows a partial front view of the automatic rotary empanada machine including empanadas output, according to an exemplary embodiment of the invention.

The above-described and other features will be appreciated and understood by those skilled in the art from the following detailed description and drawings.

DETAILED DESCRIPTION OF THE INVENTION

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

Figure 3:
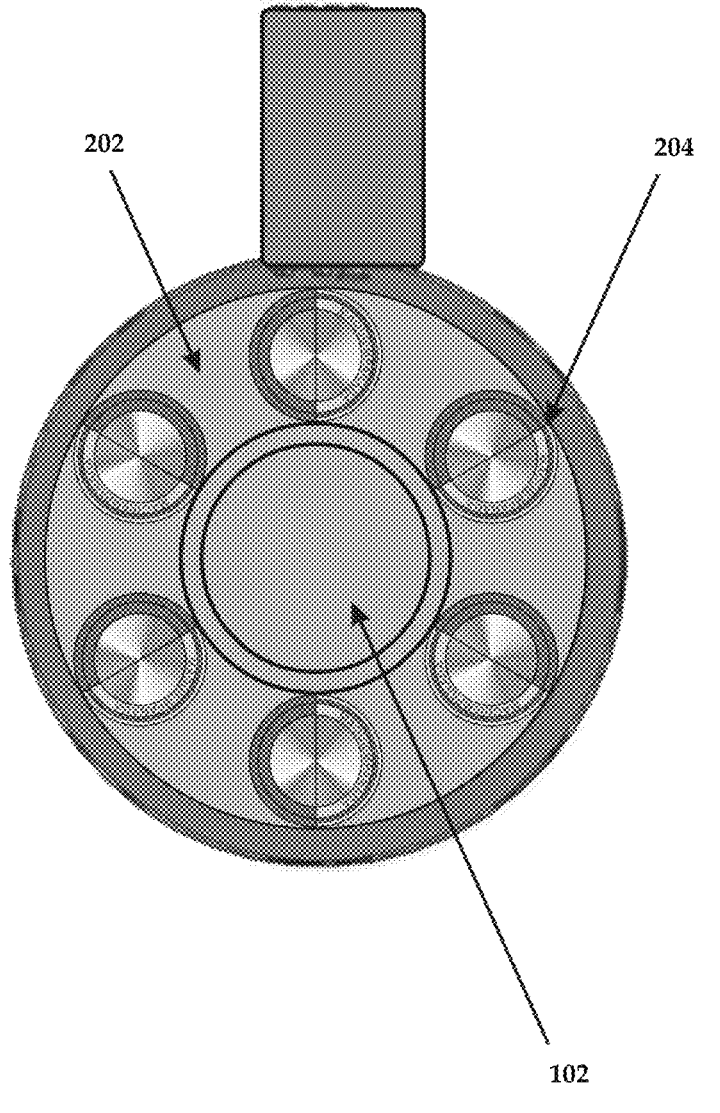
FIG. 3 shows a top view of the automatic rotary empanada machine, according to an exemplary embodiment of the invention.
Figure 4:
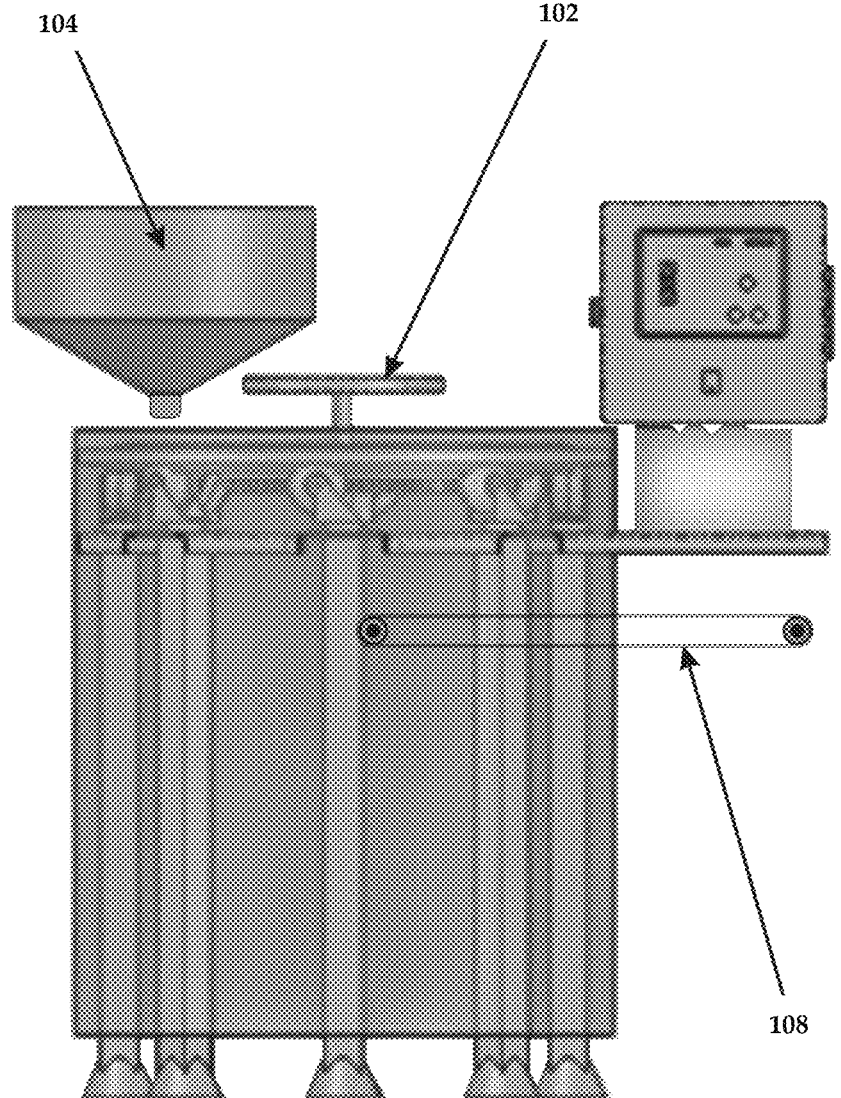
FIG. 4 shows a front view of the automatic rotary empanada machine, according to an exemplary embodiment of the invention.
Figure 7:
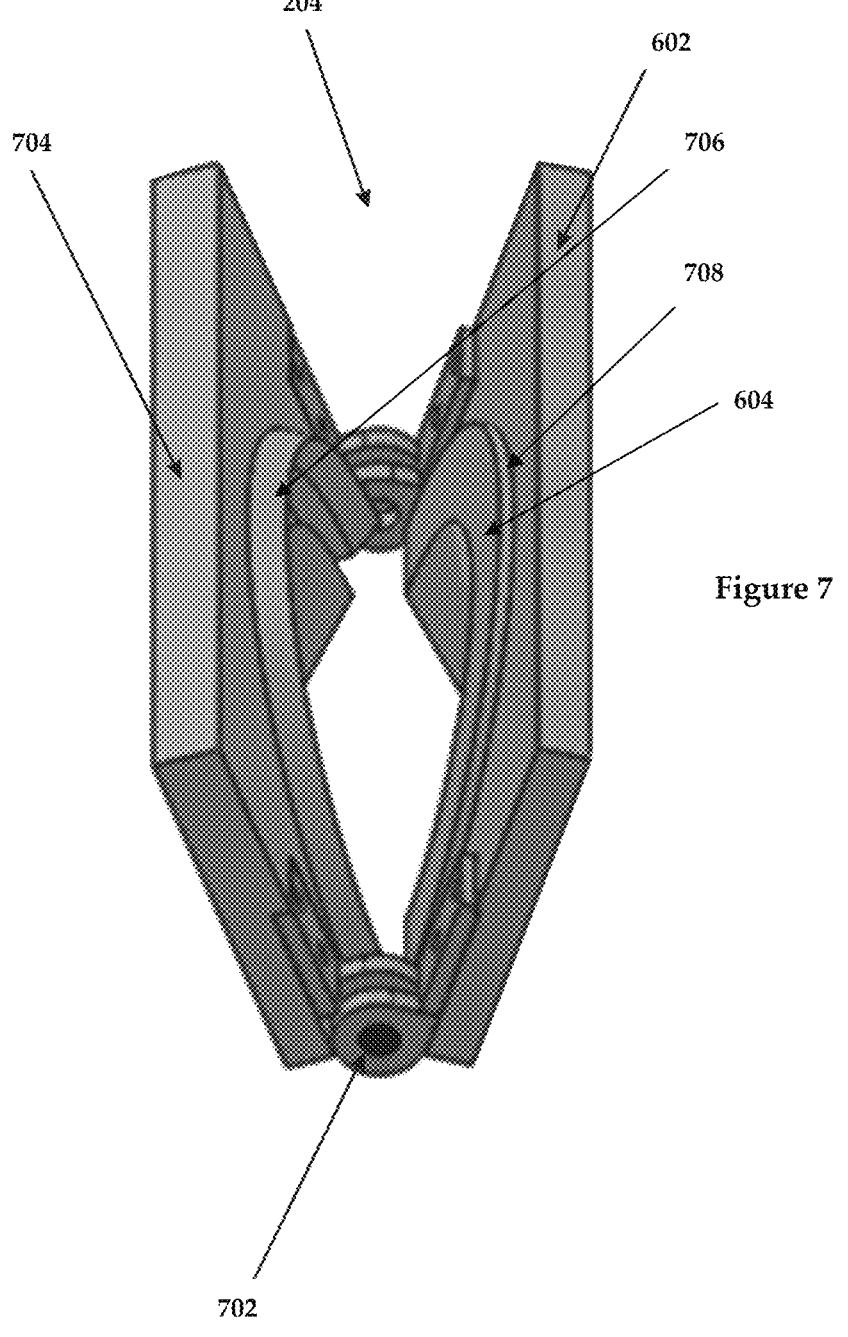
FIG. 7 shows a perspective view of the empanada mold, according to an exemplary embodiment of the invention.
Figure 8:
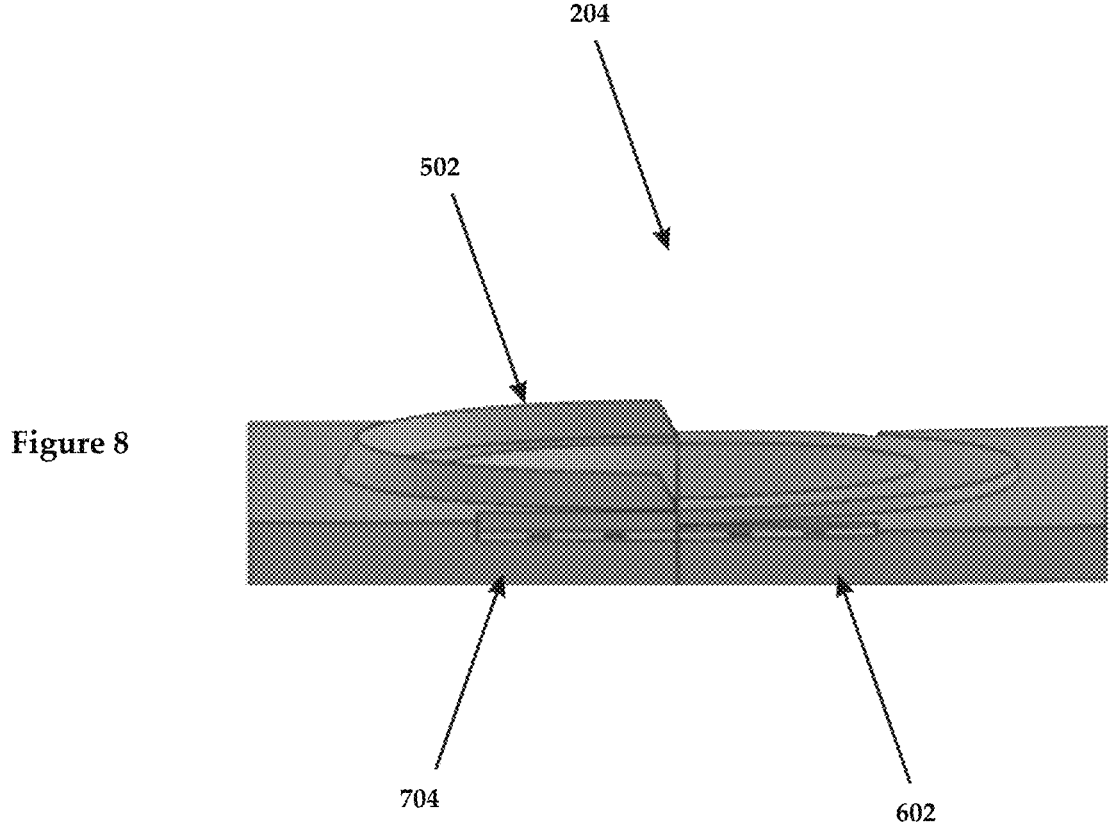
FIG. 8 shows a side view of the empanada mold, according to an exemplary embodiment of the invention.
Figure 11:
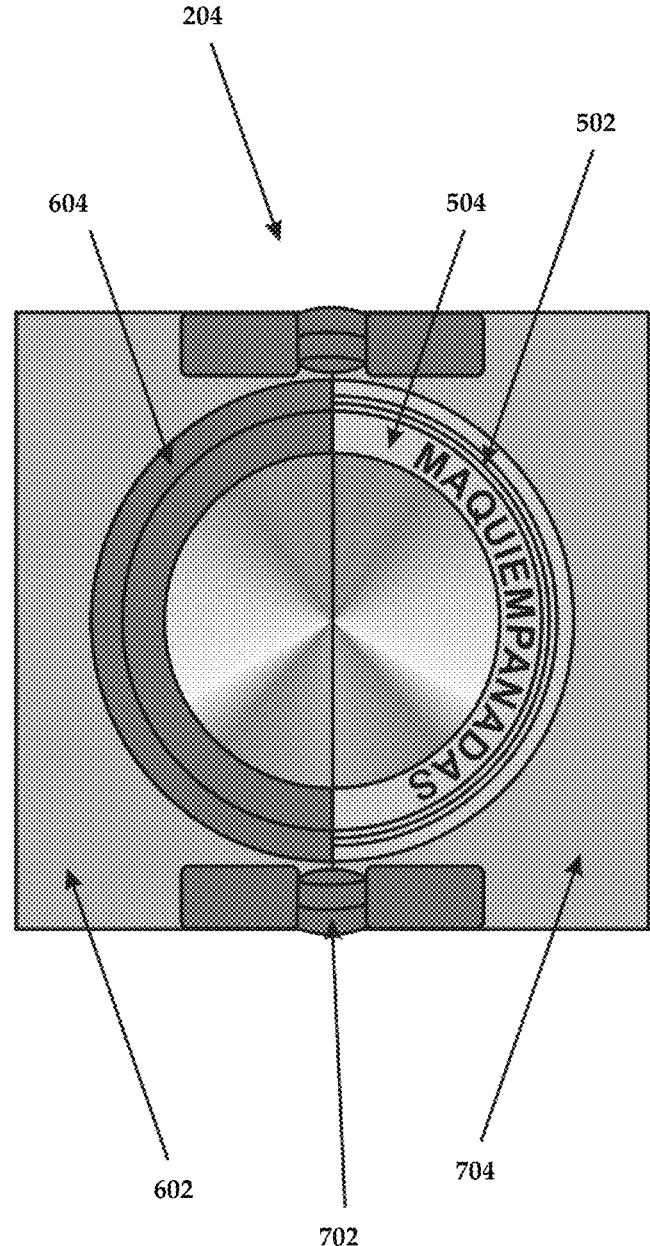
FIG. 11 shows a top view of the empanada mold, according to an exemplary embodiment of the invention.
Figure 12:
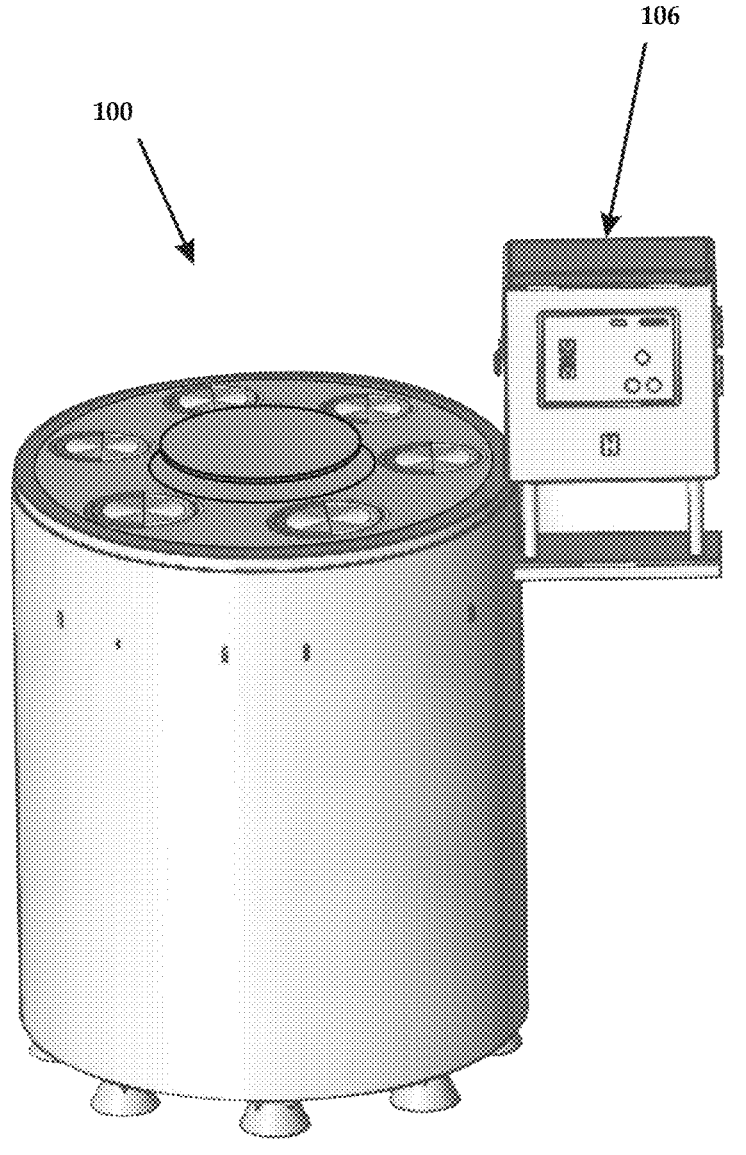
FIG. 12 shows an upper front perspective of the automatic rotary empanada machine, according to an exemplary embodiment of the invention.

In one embodiment (FIGS. 1-12), the automatic rotary empanada machine 100 is comprised of a metal frame (preferably stainless steel, but any other suitable metal may be used) having a fixed central plate 102 where the blank empanada wrappers (aka dough circles) are stacked. There is a rotating mobile deck 202 whose circular movement is accomplished by an interconnected reducer motor that also moves the six workstations (where the molds 204 are) which will be described below.

The overall machine 100 is characterized by having an automatic empanada filling dosing machine 104. The dosing machine has a container holding the filling, and an opening depositing the filling directly into the inside of the mold (holding the empanada blank) that stops under the opening as the deck 202 rotates. The dispensing may be accomplished through any known techniques, including but not limited to worm screw, pneumatic pressure blower or any other suitable dispenser of measured fillings) by dropping into the top of the dough circle placed over the empanada making mold 204.

There are six empanada making molds 204 within openings in the rotating mobile deck 202. Each of the molds 204 has two mobile jaws 702/704 hinged at a jaw 706 so that when they close, an empanada is formed. While the opening of the mold 204 is a single size, the various molds 204 may be of different sizes. In one embodiment, each half 602/704 are made of one acrylic in the shape of complementary half-moons, where one 602 nests into the other 704. One or both of them may have relief marks 504 so as to make a relief on the outside of the empanada wrapper. In addition, the shape of the empanada may be varied by the mold 204 being shaped as a half-moon, triangular, crescent, square, rectangular or any other suitable geometric shape.

Finally, the edge serves as a blade rest 502. The overlap 706 of one mold over the edge 708 of the flat 604 of the other fascia makes the cut of the wrapping mass, depending on which closes the empanada, either by placing a crescent acrylic flat or also of low relief that leave the edge of the empanada marked in high relief or in low relief. As noted above, if the acrylics are left engraved in high or low relief, then an engraving can bear the information of the manufacturer's brand, the ingredients, the name of the specific empanada variety, etc. This set of jaws 602/704 forms a mold 204 composed of the jaw 602 and a mandible 704 connected to each other by hinges 702 which are responsible for assembling six empanadas per cycle, (six stations where the forming is performed).

The different steps of the construction of the empanadas (or cakes), has a mechanism of opening and closing the individual jaws 602/704 when they are open they remain in horizontal position joined by the hinges 702, with their guide bearings 902 that are placed inside a rail 904 that opens and closes the jaws 602/704 of each mold 204 by movement of a plunger 906 that has an articulating point 912 with a bed 910 that is connected to one of the mold mandibles or jaws 602 within the vertical or horizontal position.

There is also another activator plunger 908, that drives an ejector pout which contraction springs off the empanada, which goes inside the jaw 704, whose ball-bearings 902 has no displacement on the rail 904. With an obstructing pin 1002 loaded on the ball-bearings 902 of the jaw 704 only allows the displacement of the ball-bearing 902 of the jaw 602 in order to open and close the set of jaws 602/704 of the mold 204.

Within the machine 100 the stations where the empanada is assembled are comprised of the position at which the deck 202 is stopped for each mold 204 opening. Note six is not a magic number, there could be more or less, but unless doubled, there will be a need for the following stations:

$1^{st}$ Station when the empanada flattened dough (the blank empanada wrapper) is picked from the one or more empanada blanks in the central holder 102 and placed into the top of an open mold 204 to start the automatic cycle of assembling the empanadas. The open empanada blank is then moved (through the rotation of the deck 202 into the $2^{nd}$ Station, where the empanada filling is deposited from the dosing machine 104, automatically under control of the Programmable Logic Controller (PLC) 106. After the filling, the deck 202 continues the rotation, passing into a $3^{rd}$ Station, where the mold 204 past filling partially closes as the plunger 906 is commanded to move horizontally. This motion allows gravity to stretch the empanada blank, effectively trapping the filling away from the edges 502 of the mold automatically.

As the deck 202 continues rotating, the mold 204 moves into the $4^{th}$ Station, where the mold closes completely (FIG. 9) as the guide bearings 902 meet. In one embodiment, this is accomplished through a pneumatic cylinder 906. Once the mold 204 closes, the edge of the empanada blank are closed and the excess falls off (where it is collected), and the deck 202 rotates a bit more, passing into the $5^{th}$ Station, where the mold 204 opens through the presence of an internal spring that pushes against the cylinder 906 as the cylinder retracts. Here, an operator may remove the empanada, and also remove the left-over rind or rim extra, or leave that to be cleaned in the next station. In an alternate embodiment, a displacement spring is featured at the bottom of the mold 204 hinges 702, so that by opening the hinge, the empanada will fall by gravity onto a belt 108 that will move the finished empanadas 110 out automatically.

As the deck 202 continues to rotate, the mold hinges 702 get together again, and open (FIG. 10), moving the mold onto a $6^{th}$ Station, where the mold is cleaned and the empanada blank that was cut off by the mold closing is removed, and the mold 204 is returned to the $1^{st}$ Station to repeat the whole process again.

The controller 106 may be a traditional PLC, a computer processor assembly, or an Internet of Things (IoT) device that controls the rotation of the disk 202, closing of the molds 204, the plungers 906, belts 108 and any other actuators. In one embodiment, the PLC 106 has a graphical touch screen controller, as well as access through an application linking the machine 100 to the web. Such a device 106 deals with the variables for the machine, which include throughput, speed, production quantity, time, weight, etc.

The interface of the web and of a PLC which conforms this device which has a display where the different variables of quantity are shown, time, final weight (PF) time and movement, etc. The PLC controller activates an audible alarm and a warning LED letting the manager know that the process is next to conclude. When the quantities and times, pre-established by the operator, the micro controller will activate a number of signals and alarms in order to let the operator know that the programmed process has been fulfilled. The automatic rotary empanada machine allows the IoT interface to control and store the production of the machine via internet connections.

CONCLUSION

In concluding the detailed description, it should be noted that it would be obvious to those skilled in the art that many variations and modifications can be made to the shown embodiments without substantially departing from the principles of the present invention. Also, such variations and modifications are intended to be included herein within the scope of the present invention as set forth in the disclosure.

It should be emphasized that the above-described embodiments of the present invention, particularly any "exemplary embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention.

The invention claimed is:

1. An automatic rotary empanada manufacturing system comprising:
   an programmable logic control (PLC) units sensing and activating a number of rotary motion, filling and empanada mold folding components;
   a circular rotary deck turntable having six openings, each said opening having a replaceable folding empanada mold within said opening, each said mold comprised of:
   two complementary shaped halves hinged and closed by a plunger, said plunger controlled by said PLC, wherein one said shaped hinge half-moon nests into the other while leaving the back end open at the moment of closing during an intermediate partial-closing stage prior to full closure;
   an automatic empanada filling dosing machine, with a dispenser opening placed over the center of one said opening path of motion, said dispenser controlled by said PLC;
   a central holder for empanada blanks; and
   a finished empanada belt;
   wherein the PLC controls the plunger to execute a two-stage closing sequence comprising:
   (i) a first stage in which the complementary shaped halves partially close while maintaining said back end open to permit gravitational displacement of filling away from sealing edges of the mold; and
   (ii) a second stage in which the complementary shaped halves fully close to seal and trim the empanada.

2. The system of claim 1 wherein:
   said deck rotator motion is accomplished via an electric motor;

said actuator for empanada filling dispensing and folding empanada mold is comprised of one of: a hydraulic piston, a pneumatic piston, worm gear, pinion or rack; and each said actuator for empanada filling dispensing and folding empanada mold is adjustable according to the raw material from which the dough is made.

3. The system of claim 2 wherein:

at least one of each said actuator for empanada filling dispensing and folding empanada mold is under said PLC units' control.

4. An automatic rotary empanada manufacturing method comprising:

an programmable logic control (PLC) units sensing and activating a number of rotary motion, filling and empanada mold folding components;

a circular rotary deck turntable having six openings, each said opening having a replaceable folding empanada mold within said opening, each said mold comprised of:

two complementary shaped halves hinged and closed by a plunger, said plunger controlled by said PLC, wherein one said shaped hinge half-moon nests into the other while leaving the back end open at the moment of closing during an intermediate partial-closing stage prior to full closure;

an automatic empanada filling dosing machine, with a dispenser opening placed over the center of one said opening path of motion, said dispenser controlled by said PLC;

a central holder for empanada blanks; and a finished empanada belt;

wherein the method further comprises:

partially closing the complementary shaped halves while maintaining said back end open to permit gravitational displacement of filling away from sealing edges of the mold; and thereafter fully closing the complementary shaped halves to seal and trim the empanada.

5. The method of claim 4 wherein:

said deck rotator motion is accomplished via an electric motor;

said actuator for empanada filling dispensing and folding empanada mold is comprised of one of: a hydraulic piston, a pneumatic piston, worm gear, pinion or rack; and each said actuator for empanada filling dispensing and folding empanada mold is adjustable according to the raw material from which the dough is made.

6. The method of claim 5 wherein:

at least one of each said actuator for empanada filling dispensing and folding empanada mold is under said PLC units' control.

* * * * *